United States Patent
Khavin et al.

(10) Patent No.: US 11,188,300 B1
(45) Date of Patent: Nov. 30, 2021

(54) PREPARATION AND EXECUTION OF QUANTIZED SCALING ON INTEGRATED CIRCUITRY

(71) Applicant: Edgecortix Pte. Ltd., Singapore (SG)

(72) Inventors: Oleg Khavin, Tokyo (JP); Nikolay Nez, Tokyo (JP); Sakyasingha Dasgupta, Tokyo (JP); Antonio Tomas Nevado Vilchez, Tokyo (JP)

(73) Assignee: EDGECORTIX PTE. LTD., Singapore (SG)

( * ) Notice: Subject to any disclaimer, the term of this patent is extended or adjusted under 35 U.S.C. 154(b) by 0 days.

(21) Appl. No.: 17/351,250

(22) Filed: Jun. 18, 2021

(30) Foreign Application Priority Data

Oct. 16, 2020 (JP) .............................. JP2020-174978

(51) Int. Cl.
  *G06F 5/01* (2006.01)
  *G06F 17/17* (2006.01)
(52) U.S. Cl.
  CPC .............. *G06F 5/012* (2013.01); *G06F 17/17* (2013.01)
(58) Field of Classification Search
  CPC . G06F 17/16; G06F 17/17; G06F 5/01; G06F 5/012; H03M 7/24; H03M 7/30; H03M 7/3059; H03H 2017/0207
  See application file for complete search history.

(56) References Cited

U.S. PATENT DOCUMENTS

| | | | | |
|---|---|---|---|---|
| 6,014,143 A | * | 1/2000 | Naqvi | ..................... G06T 15/06 345/421 |
| 6,064,444 A | * | 5/2000 | Miyazaki | .............. G06T 3/4007 348/581 |
| 2015/0003755 A1 | * | 1/2015 | Mizuno | ................. G06T 3/4007 382/298 |
| 2020/0257960 A1 | | 8/2020 | Gabriel et al. | |

FOREIGN PATENT DOCUMENTS

JP 201512415 A 1/2015

OTHER PUBLICATIONS

Decision to Grant in JP Application No. 2020-174978, dated Mar. 23, 2021. 6pp.

* cited by examiner

*Primary Examiner* — Matthew D Sandifer
(74) *Attorney, Agent, or Firm* — Hauptman Ham, LLP

(57) ABSTRACT

Preparation and execution of quantized scaling may be performed by operations including obtaining an original array and a scaling factor representing a ratio of a size of the original array to a size of a scaled array, determining, for each column of the scaled array, a horizontal coordinate of each of two nearest elements in the horizontal dimension of the original array, and, for each row of the scaled array, a vertical coordinate of each of two nearest elements in the vertical dimension of the original array, calculating, for each row of the scaled array and each column of the scaled array, a linear interpolation coefficient, converting each value of the original array from a floating point number into a (Continued)

quantized number, converting each linear interpolation coefficient from a floating point number into a fixed point number, storing, in a memory, the horizontal coordinates and vertical coordinates as integers, the values as quantized numbers, and the linear interpolation coefficients as fixed point numbers.

17 Claims, 14 Drawing Sheets

PREPARATION AND EXECUTION OF QUANTIZED SCALING ON INTEGRATED CIRCUITRY

RELATED APPLICATIONS

The present application claims priority to Japanese Patent Application No. 2020-174978 filed Oct. 16, 2020, the disclosure of which is hereby incorporated by reference herein in its entirety.

BACKGROUND

Technical Field

The present invention relates to preparation and execution of quantized scaling. More specifically, the present invention relates to preparation of a scaling operation for execution on an integrated circuit.

Background

Scaling operations are common, including scaling operations performed by integrated circuits, such as neural network accelerators. Because edge devices usually have limited computational resources, the attraction of using an integrated circuit is usually in its efficiency. There is a need for more efficient scaling operations, especially those performed by integrated circuits.

SUMMARY

According to an aspect of the present invention, provided is a computer program including instructions that are executable by a computer to cause the computer to perform operations for preparation of a scaling operation for execution on an integrated circuit. The operations include obtaining an original array and a scaling factor representing a ratio of a size of the original array to a size of a scaled array, determining, for each column of the scaled array, a horizontal coordinate of each of two nearest elements in the horizontal dimension of the original array, and, for each row of the scaled array, a vertical coordinate of each of two nearest elements in the vertical dimension of the original array, calculating, for each row of the scaled array and each column of the scaled array, a linear interpolation coefficient, converting each value of the original array from a floating point number into a quantized number, converting each linear interpolation coefficient from a floating point number into a fixed point number, storing, in a memory, the horizontal coordinates and vertical coordinates as integers, the values as quantized numbers, and the linear interpolation coefficients as fixed point numbers.

This aspect may also include the method performed by the processor executing the instructions of the computer program, and an apparatus that performs the method. The apparatus may include sections configured to perform the operations of the method.

According to another aspect of the present invention, provided is a computer program including instructions that are executable by an integrated circuit to cause the integrated circuit to perform operations for a scaling operation. The operations include receiving an instruction to generate a scaled array from an original array, reading, from an external memory, for each column of at least a portion of the scaled array, a predetermined horizontal coordinate integer for each of two nearest elements in the horizontal dimension of the original array and a horizontal linear interpolation coefficient fixed point number, for each row of the portion of the scaled array, a predetermined vertical coordinate integer of each of two nearest elements in the vertical dimension of the original array and a vertical linear interpolation coefficient fixed point number, and, for each combination of the predetermined horizontal coordinate integers and the predetermined vertical coordinate integers, a value quantized number of the original array, and calculating each element of the portion of the scaled array by applying linear interpolation to value quantized numbers of the original array corresponding to the row of the element and the column of the element, the horizontal linear interpolation coefficient fixed point number corresponding to the column of the element, and the vertical linear interpolation coefficient fixed point number corresponding to the row of the element.

The summary does not describe all necessary features of the embodiments of the present invention. The present invention may also be a sub-combination of the features described above.

DESCRIPTION OF EXEMPLARY EMBODIMENTS

Hereinafter, example embodiments of the present invention will be described. The example embodiments shall not limit the invention according to the claims, and the combinations of the features described in the embodiments are not necessarily essential to the invention.

One of the biggest impacts on the efficiency of an integrated circuit is in how often access to an external memory, such as a DRAM, occurs during performance of a task. Scaling operations may involve many computations. However, many of those computations are repeated. Instead of repeating such computations, they can be pre-computed by a host processor for more efficient performance by the integrated circuit.

Furthermore, many of the computations involve real numbers. Real numbers are usually stored as floating point numbers for higher accuracy. However, floating point numbers also require more storage space than other types of numbers. For example, storage of a floating point number can be represented by:

$$\text{Real Number} = \pm S*1 \cdot X*2^E \qquad \text{EQ. 1}$$

where X is a unique 23-bit mantissa, E is a unique 8-bit exponent, and S is a unique 1-bit sign, requiring a total of 32 bits of storage for each real number. On the other hand, if a real number is stored as a quantized number, the amount of storage can be reduced. For example, storage of a quantized number can be represented by:

$$\text{Real Number} = (X-ZP)*SC \qquad \text{EQ. 2}$$

where X is a unique 8-bit quantized value, SC is a common scale coefficient, or multiplier, and ZP is a common zero point, or shift value, requiring only 8 bits of storage for each real number, assuming the storage capacity for the common SC and ZP are negligible on a per real number basis.

Figure 1:
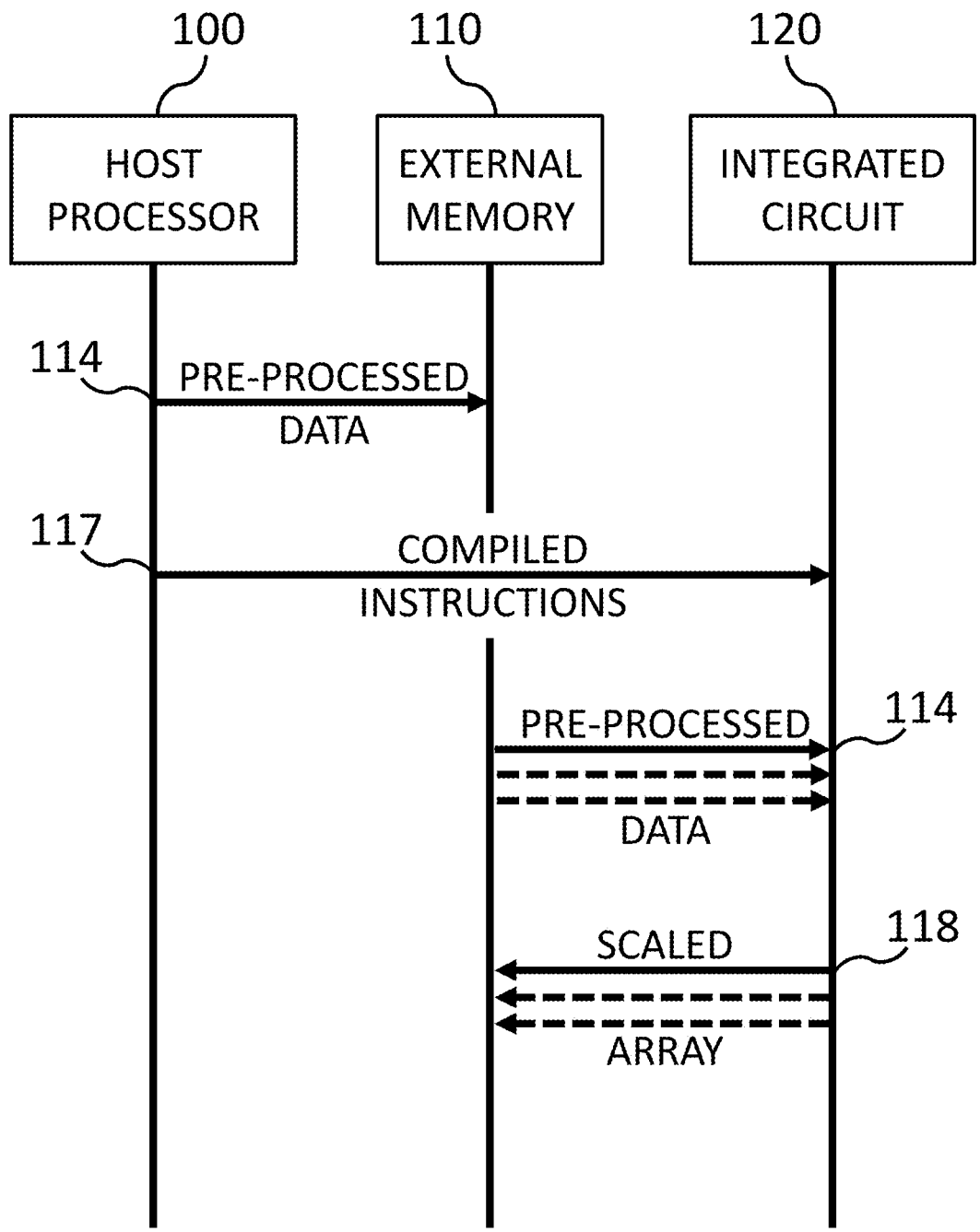
FIG. 1 shows a system for preparation and execution of quantized scaling, according to an embodiment of the present invention.

FIG. 1 shows a system for preparation and execution of quantized scaling, according to an embodiment of the present invention. The system includes a host processor 100, an external memory 110, and an integrated circuit 120. Host processor 100 and integrated circuit 120 are in communication with external memory 110. Host processor 100 performs preparation for execution of quantized scaling using integrated circuit 120 which pre-processes data for the scaling operation. Host processor 100 then writes pre-processed data 114 to external memory 110. Host processor 100 also compiles instructions that, when executed by integrated circuit 120, cause integrated circuit 120 to perform a scaling operation. Host processor 100 transfers compiled instructions 117 to integrated circuit 120, and causes integrated circuit 120 to execute compiled instructions 117 to perform a scaling operation. During the scaling operation, integrated circuit 120 reads pre-processed data 114 from external memory 110 in one or more portions. As elements of scaled array 118 are computed by integrated circuit 120, integrated circuit writes scaled array 118 to external memory 110.

Figure 2A:
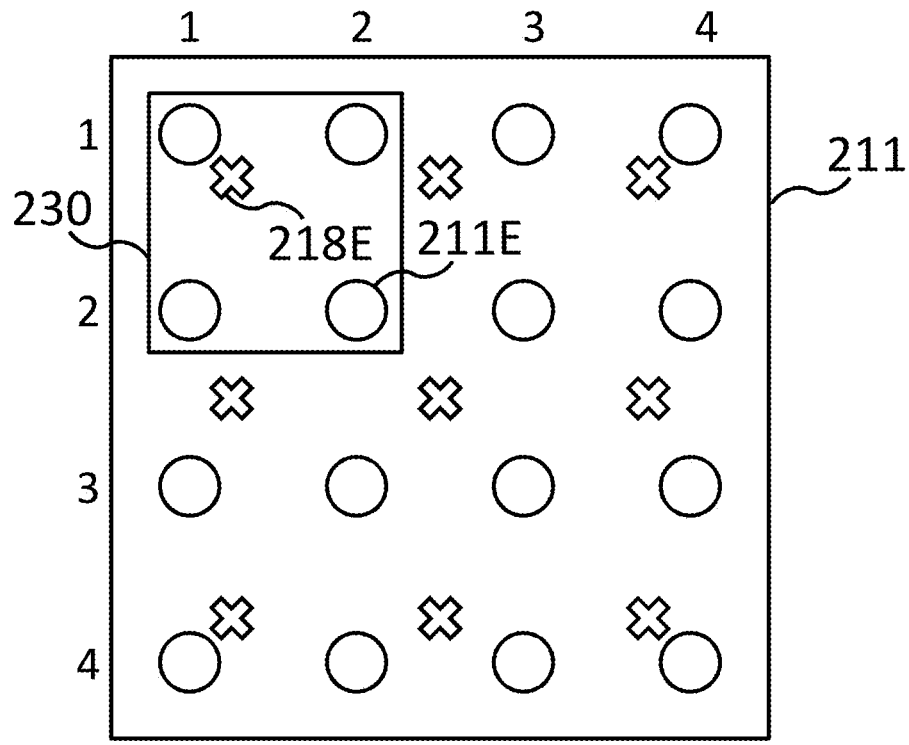
FIG. 2A shows an original array subject to a scaling operation, according to an embodiment of the present invention.

FIG. 2A shows an original array 211 subject to a scaling operation, according to an embodiment of the present invention. Original array 211 is composed of elements, such as element 211E, each element having a value. In this embodiment, the scaling operation will downscale original array 211 from a 4×4 array to a 3×3 array. The scaled array will be composed of elements such as element 218E. Each element of the scaled array is calculated based on the values of each of the four nearest elements of original array 211.

Figure 2B:
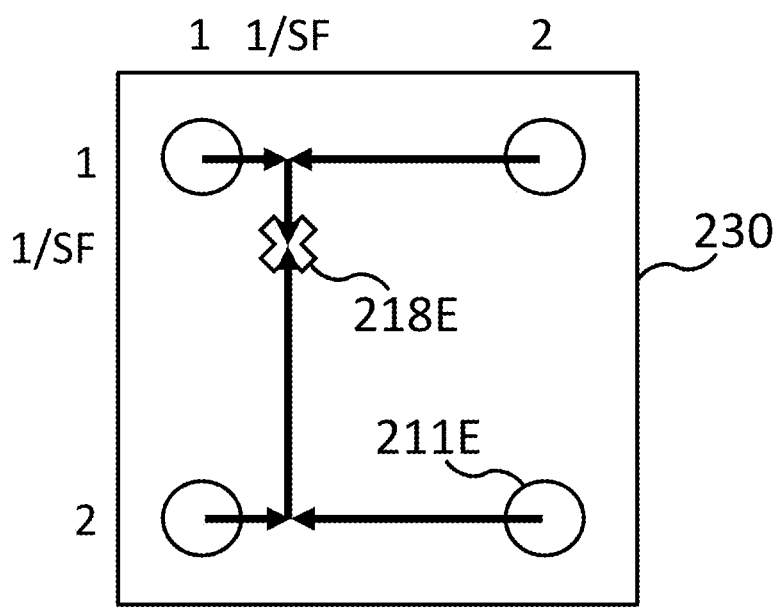
FIG. 2B shows a diagram of a scaling operation, according to an embodiment of the present invention.

FIG. 2B shows a diagram of a scaling operation of element 218E, according to an embodiment of the present invention. Element 218E is an element of the scaled array, and is calculated from each of the four nearest elements of original array 211, such as 211E. The calculation of element 218E is based on the values of each of the four nearest elements of original array 211, and also the distance of each element from element 218E. In this embodiment, intermediary values between elements of the original array along the same row are calculated for the row above element 218E and below element 218E. Once the intermediary values are determined, then element 218E can be calculated based on the intermediary values and the distance of each intermediary value from element 218E. More specifically, the intermediate value above element 218E is equal to the value of the upper left element plus the difference between the value of the upper right element and the value of the upper left element multiplied by the distance between 1 and 1/SF (scaling factor). This calculation is repeated for the intermediate value below element 218E, and then for the value of element 218E based on the intermediate values. The distance between 1 and 1/SF is referred to as the linear interpolation coefficient, and will vary with the row and column of the element of the scaled array. Calculation of the linear interpolation coefficient is described herein below.

Figure 3:
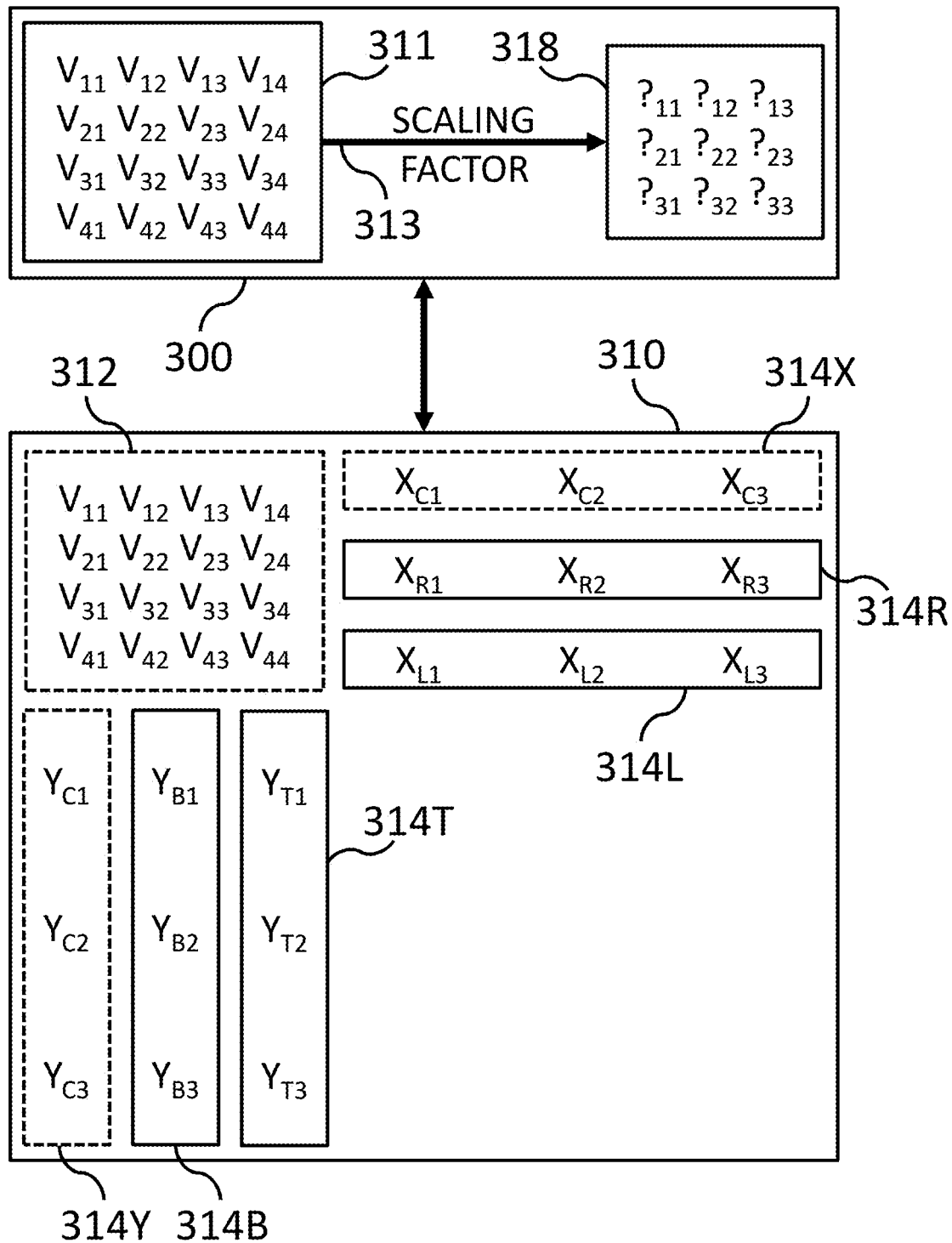
FIG. 3 shows a system for preparation of a scaling operation, according to an embodiment of the present invention.

FIG. 3 shows a system for preparation of a scaling operation, according to an embodiment of the present invention. The system includes host processor 300 and external memory 310. Host processor 300 processes an original array 311 and a scaling factor 313 to produce pre-processed data for storage on external memory 310 so that the scaling operation may be performed by an integrated circuit to obtain a scaled array 318. In doing so, host processor 300 may write the pre-processed data to the external memory, including nearest left coordinate integers 314L, nearest right coordinate integers 314R, nearest top coordinate integers 314T, nearest bottom coordinate integers 314B, horizontal linear interpolation coefficient quantized numbers 314X, vertical linear interpolation coefficient quantized numbers 314Y, and value fixed point numbers of the original array 312. This pre-processed data may be the same for any original array to be converted using scaling factor 313, which may allow host processor 300 to reuse the pre-processed data for multiple scaling operations. For example, if a scaling operation is used in the course of neural network inference, then the scaling operation may be performed many times, each time using original arrays of different values. However, the same pre-processed data may be reused as long as scaling factor 313 is the same. More specifically, the same pre-processed data may be used to scale original arrays of the same size or smaller. For larger original arrays, the same pre-processed data may be used, but more pre-processed data must be calculated to account for the additional original values.

Figure 4:
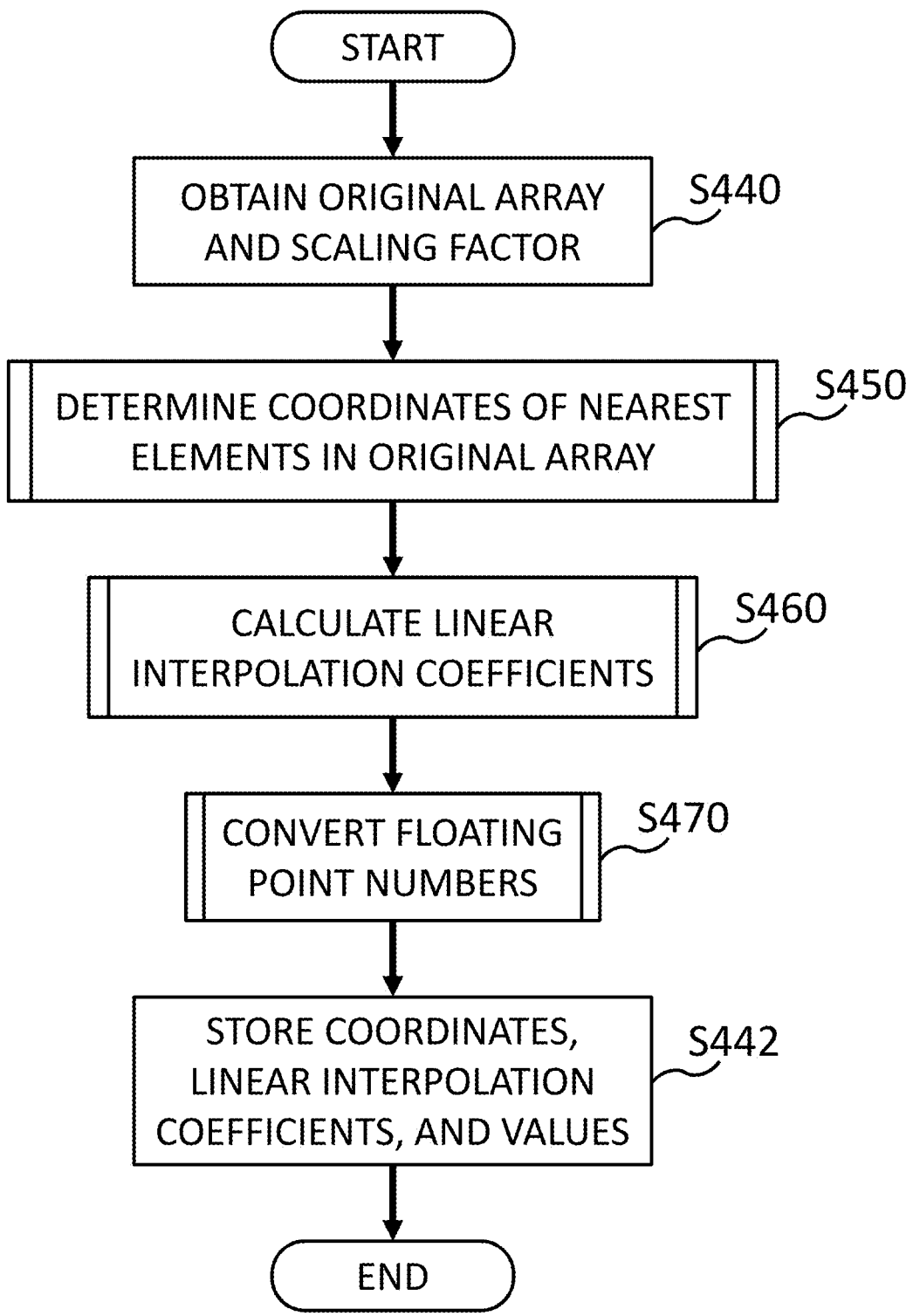
FIG. 4 shows an operational flow for preparation of a scaling operation, according to an embodiment of the present invention.

FIG. 4 shows an operational flow for preparation of a scaling operation, according to an embodiment of the present invention. The operational flow may provide a method for preparation of a scaling operation. The method may be performed by a host processor including sections for performing certain operations, such as the host processor shown in FIG. 14, which will be explained hereinafter.

At S440, an obtaining section obtains an original array and a scaling factor representing a ratio of a size of the original array to a size of a scaled array. For purposes of preparation of the scaling operation, the values of the original array are not necessary, but the dimensions of the original array in terms of number of horizontal elements and number of vertical elements determine the extent of the pre-processing. The scaling factor can be any number, and although it is generally not equal to 1, the operational flow would still function in the same manner Scaling factors between 0 and 1 represent a downscaling, or a reduction in the size of an original array. Scaling factors greater than 1 represent an upscaling, or an increase in the size of an original array. In some embodiments, there may be more than one scaling factor, such as one scaling factor for the horizontal dimension, and another scaling factor for the vertical dimension. In some embodiments, the scaling factor may be obtained through derivation from the size of the original array and the size of the scaled array.

At S450, a determining section determines for each column of the scaled array, a horizontal coordinate of each of two nearest elements in the horizontal dimension of the original array, and, for each row of the scaled array, a vertical coordinate of each of two nearest elements in the vertical dimension of the original array. This identifies the coordinates of the values of the original array that will be used to calculate the value of an element of the scaled array, such as shown in FIG. 2B for element 218E. Although a value of the original array is identified by two coordinates, in this operation the horizontal coordinates are determined separately from the vertical coordinates. FIG. 3 shows a logical depiction of how these may be stored on the external memory. Each element of the scaled array corresponds to four coordinates, a top coordinate, a bottom coordinate, a left coordinate, and a right coordinate, which, when combined, yield the coordinates of the upper-left element of the original array, the upper-right element of the original array, the lower-left element of the original array, and the lower-right element of the original array. The determination is further described in FIG. 5.

At S460, a calculating section calculates, for each row of the scaled array and each column of the scaled array, a linear interpolation coefficient. For example, if the scaled array is represented by rows of i, where i is 1 to n, n being the number of rows, then the vertical linear interpolation coefficient $Y_{Ci}$ may be calculated by:

$$Y_{Ci} = i * \frac{1}{SF} - Y_{Ti} \qquad \text{EQ. 3}$$

where SF is the scaling factor, or vertical scaling factor, and $Y_{Ti}$ is the nearest top coordinate to row i of the scaled array. The vertical linear interpolation coefficient of each row may be calculated accordingly, and the horizontal linear interpolation coefficient of each column may be calculated similarly, by switching the dimensions. The calculation is further described in FIG. 6.

At S470, a converting section converts each value of the original array from a floating point number into a quantized number, and converts each linear interpolation coefficient from a floating point number into a fixed point number. Assuming the values of the original array are real numbers, each value is typically stored as a floating point number. The converting section converts these value floating point numbers to quantized numbers, to decrease the amount of storage space each value occupies. Each linear interpolation coefficient calculated at S460 is also a real number stored as a floating point number. The converting section converts these coefficient floating point numbers to fixed point numbers, to decrease the amount of storage space each value occupies. The conversion is further described in FIG. 7.

At S442, a storing section stores, in a memory, the horizontal coordinates and vertical coordinates as integers, the values as quantized numbers, and the linear interpolation coefficients as fixed point numbers.

While in this embodiment it is described that the linear interpolation coefficients are stored as floating point numbers and then converted to fixed point numbers, in other embodiments the linear interpolation coefficients may be stored as fixed point numbers following the calculation, meaning the calculation and conversion happens at once, and the linear interpolation coefficients are never actually stored as floating point numbers.

Figure 5:
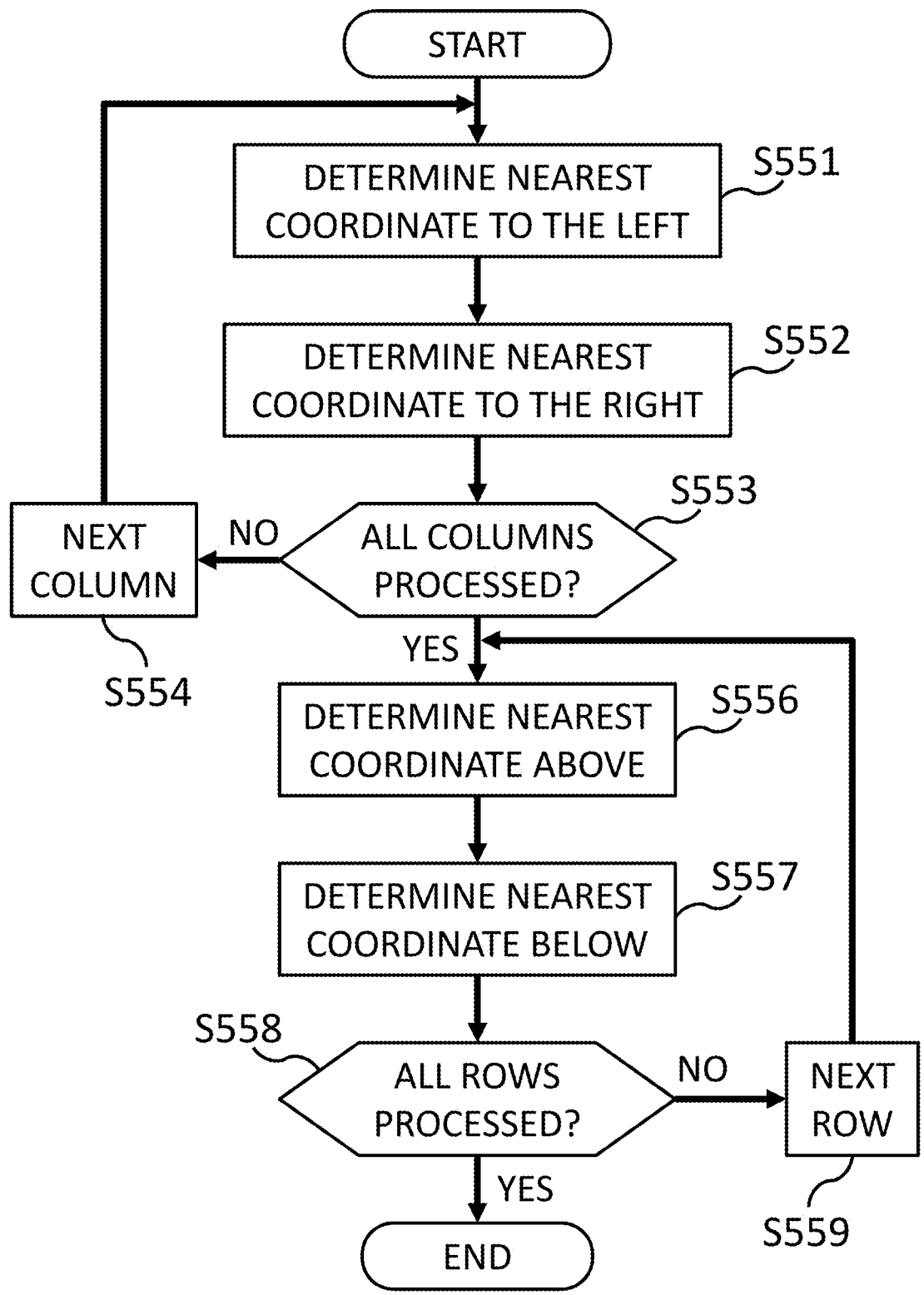
FIG. 5 shows an operational flow for determining coordinates of nearest elements, according to an embodiment of the present invention.

FIG. 5 shows an operational flow for determining coordinates of nearest elements, according to an embodiment of the present invention. The operations within this operational flow may be performed by a determining section or a correspondingly named sub-section thereof. As described in FIG. 4, the original array and scaling factor are obtained prior to determining coordinates of nearest elements.

At S551, the determining section or a sub-section thereof determines the nearest coordinate of the original array to the left of the first column of the scaled array. In the example shown in FIG. 2B, the nearest coordinate of the original array to the left of the first column of the scaled array, represented by element 218E, is 1, which represents the first column of the original array. The nearest coordinates can be determined mathematically using floor and ceiling functions of i/SF, where i is the row (or column) number of the scaled array. In the example of FIG. 2B, the scaling factor is 0.75, and therefore i/SF for the first row is 1/0.75=4/3. Floor(4/3)=1, meaning that the nearest coordinate of the original array above the first row of the scaled array is 1, and Ceiling(4/3)=2, meaning that the nearest coordinate of the original array below the first row of the scaled array is 2.

At S552, the determining section or a sub-section thereof determines the nearest coordinate of the original array to the right of the first column of the scaled array. In the example shown in FIG. 2B, the nearest coordinate to the right of the first column of the scaled array, represented by element 218E, is 2, which represents the second column of the original array.

At S553, the determining section or a sub-section thereof determines whether or not there are remaining columns for nearest coordinate determination. If there are more undetermined columns, then the operational flow selects the next column (S554) before proceeding to another iteration of S551. If there are no more undetermined columns, then the operational flow proceeds to S556, to begin determining the nearest coordinates to the rows of the scaled array.

At S556, the determining section or a sub-section thereof determines the nearest coordinate of the original array above the first row of the scaled array. In the example shown in FIG. 2B, the nearest coordinate of the original array above the first row of the scaled array, represented by element 218E, is 1, which represents the first row of the original array.

At S557, the determining section or a sub-section thereof determines the nearest coordinate of the original array below the first row of the scaled array. In the example shown in FIG. 2B, the nearest coordinate below the first row of the scaled array, represented by element 218E, is 2, which represents the second row of the original array.

At S558, the determining section or a sub-section thereof determines whether or not there are remaining rows for nearest coordinate determination. If there are more undetermined rows, then the operational flow selects the next row (S559) before proceeding to another iteration of S556. If there are no more undetermined rows, then the operational flow ends.

Figure 6:
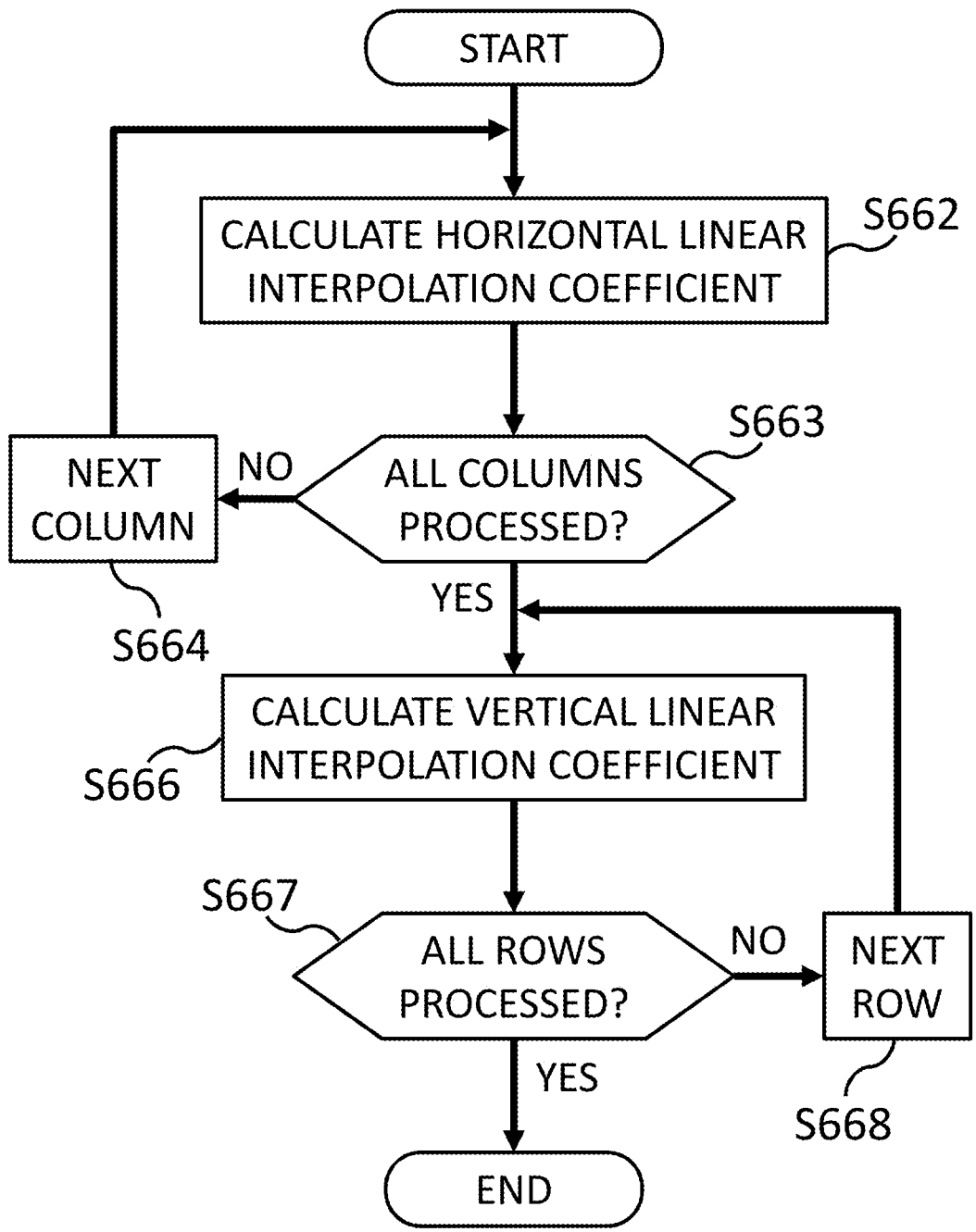
FIG. 6 shows an operational flow for calculating linear interpolation coefficients, according to an embodiment of the present invention.

FIG. 6 shows an operational flow for calculating linear interpolation coefficients, according to an embodiment of the present invention. The operations within this operational flow may be performed by a calculating section or a correspondingly named sub-section thereof. As described in FIG. 4, the original array, scaling factor, and nearest coordinates are obtained prior to calculating linear interpolation coefficients.

At S662, the calculating section or a sub-section thereof calculates the horizontal linear interpolation coefficient of the first column of the scaled array. In the example shown in FIG. 2B, the horizontal linear coefficient of the first column, $X_{C1}$, can be calculated using EQ. 3 (1*1/(¾)−1) to yield ⅓.

At S663, the calculating section or a sub-section thereof determines whether or not there are remaining columns for coefficient calculation. If there are more uncalculated columns, then the operational flow selects the next column (S664) before proceeding to another iteration of S662. If there are no more uncalculated columns, then the operational flow proceeds to S666, to begin calculation of coefficients of the rows of the scaled array.

At S666, the calculating section or a sub-section thereof calculates the vertical linear interpolation coefficient of the first column of the scaled array. In the example shown in FIG. 2B, the vertical linear coefficient of the first column, $Y_{C1}$, can be calculated using EQ. 3 (1*1/(¾)−1) to yield ⅓.

At S667, the calculating section or a sub-section thereof determines whether or not there are remaining rows for coefficient calculation. If there are more uncalculated rows, then the operational flow selects the next row (S664) before proceeding to another iteration of S666. If there are no more uncalculated rows, then the operational flow ends.

Figure 7:
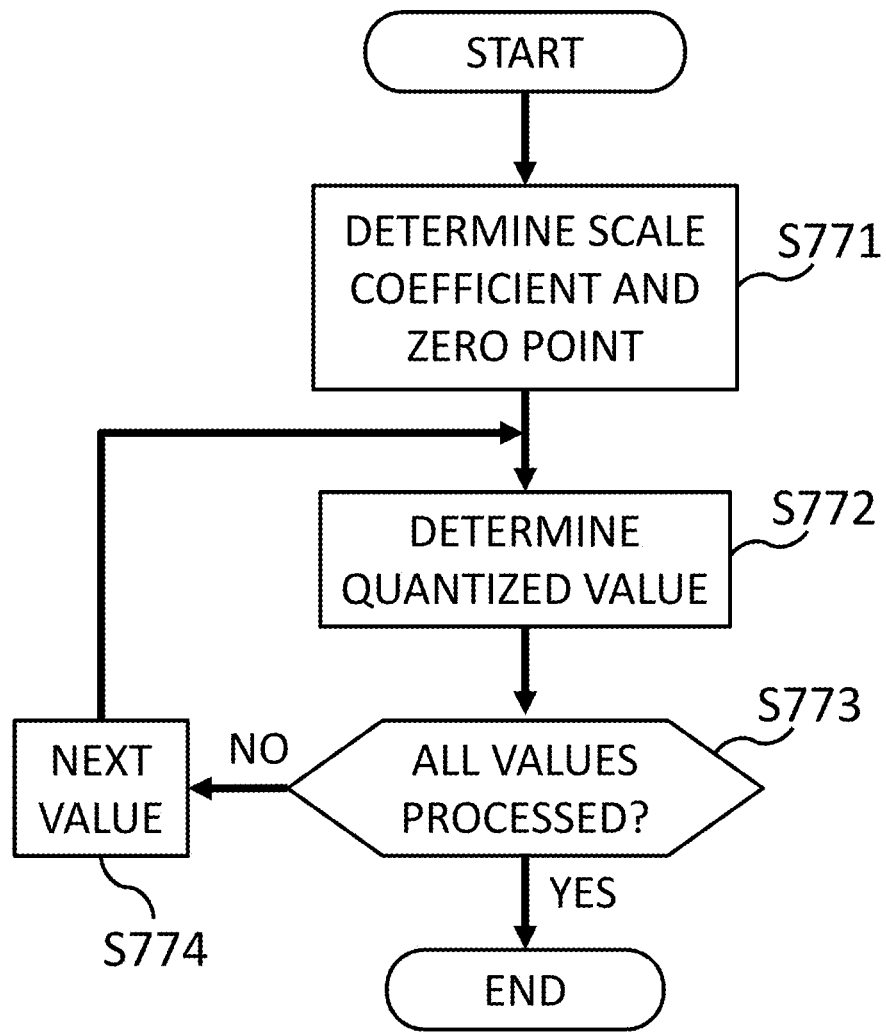
FIG. 7 shows an operational flow for converting value floating point numbers to quantized numbers, according to an embodiment of the present invention.

FIG. 7 shows an operational flow for converting value floating point numbers to quantized numbers, according to an embodiment of the present invention. The operations within this operational flow may be performed by a converting section or a correspondingly named sub-section thereof. Although the values of the original array are not necessary to perform all of the operations in FIG. 4, the values of the original array are necessary to perform the operational flow of FIG. 7.

At S771, the converting section or a sub-section thereof determines an appropriate scale coefficient and an appropriate zero point. The scale coefficient and zero point can be computed or selected based on the values of the original array.

At S772, the converting section or a sub-section thereof determines a quantized value from the value of the original array, the scaling factor, and the zero point. For example, the value of the original array may be divided by the scaling factor and then increased by the zero point, resulting in a quantized value.

At S773, the converting section or a sub-section thereof determines whether or not there are remaining values for quantization. If there are more unquantized values, then the operational flow selects the next value (S774) before proceeding to another iteration of S772. If there are no more unquantized values, then the operational flow ends.

Figure 8:
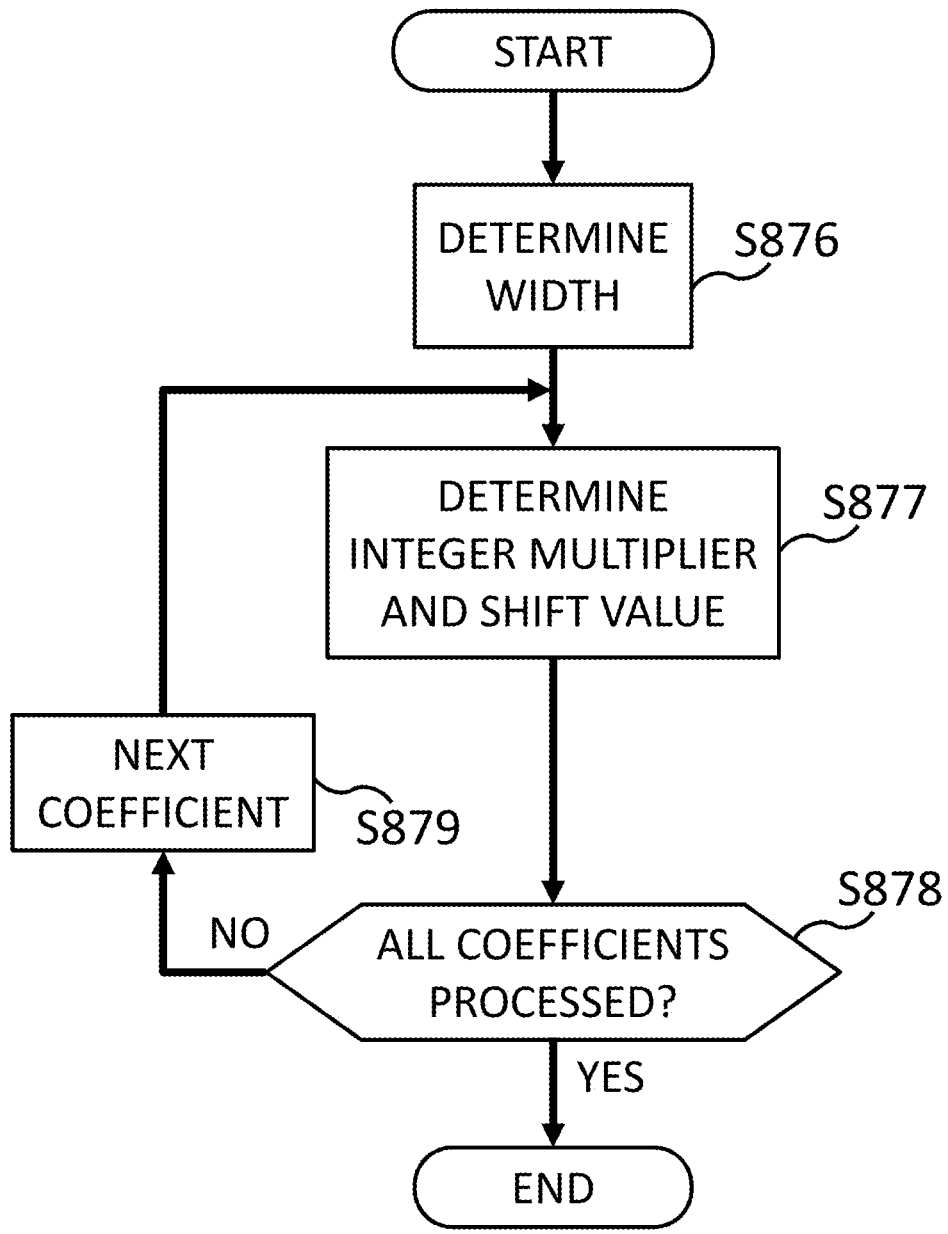
FIG. 8 shows an operational flow for converting coefficient floating point numbers to fixed point numbers, according to an embodiment of the present invention.

FIG. 8 shows an operational flow for converting coefficient floating point numbers to fixed point numbers, according to an embodiment of the present invention. The operations within this operational flow may be performed by a converting section or a correspondingly named sub-section thereof. As described in FIG. 4, the linear interpolation coefficients are calculated before converting floating point numbers.

At S876, the converting section or a sub-section thereof determines an appropriate width. The width can be computed or selected for balance of accuracy and resource usage.

At S877, the converting section or a sub-section thereof determines an integer multiplier and a shift value from the linear interpolation coefficient. In other words, each fixed point number includes an integer multiplier and an integer shift value. The size of the integer multiplier is defined by the width determined at S876. In some embodiments, the integer shift value can be fixed to have constant post-multiplication shift. In other words, the integer shift value can be the same for all fixed point numbers.

At S878, the converting section or a sub-section thereof determines whether or not there are remaining linear interpolation coefficients for conversion. If there are more unconverted linear interpolation coefficients, then the operational flow selects the next value (S879) before proceeding to another iteration of S877. If there are no more unconverted linear interpolation coefficients, then the operational flow ends.

Figure 9:
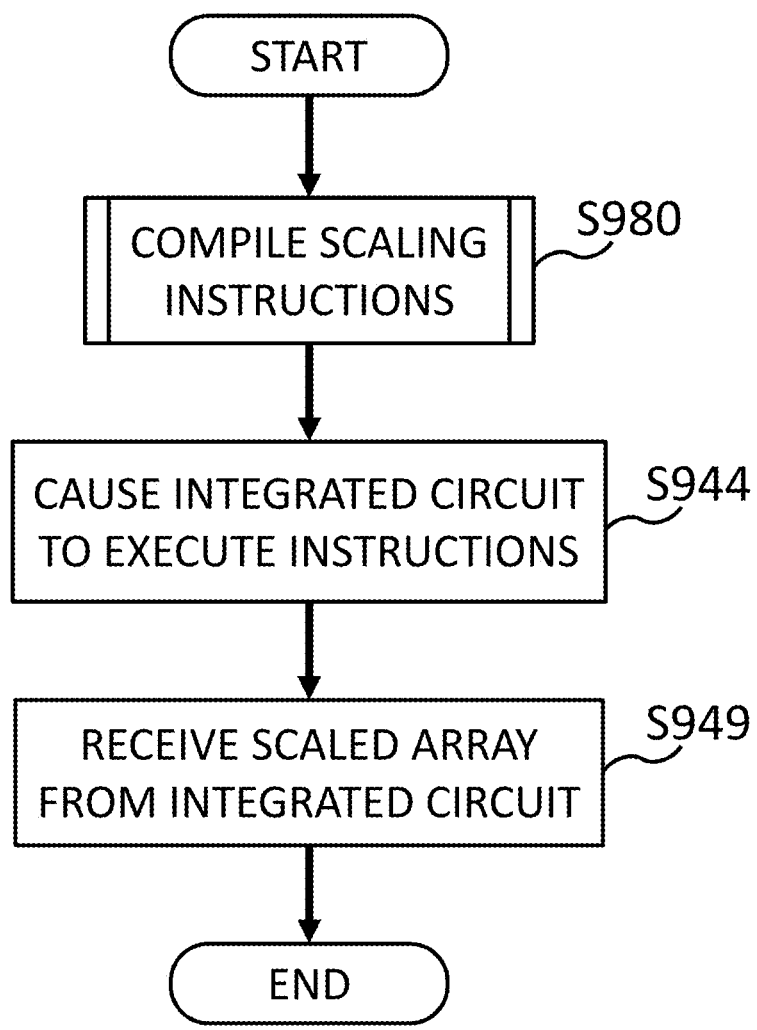
FIG. 9 shows an operational flow for a scaling operation, according to an embodiment of the present invention.

FIG. 9 shows an operational flow for a scaling operation, according to an embodiment of the present invention. The operational flow may provide a method for a scaling operation. The method may be performed by an instructing section or a correspondingly named sub-section thereof. As described in FIG. 4, the original array, scaling factor, nearest coordinates, and linear interpolation coefficients are obtained prior to the scaling operation.

At S980, a compiling section, such as the instructing section or a sub-section thereof, compiles instructions to perform the scaling operation. The instructions are compiled such that an integrated circuit can execute the instructions to perform a scaling operation of an original array using pre-processed data including nearest coordinates, linear interpolation coefficients stored as fixed point numbers, and values of the original array stored as quantized numbers. For example, the instructions may cause the integrated circuit to read, from the memory, for each column of at least a portion of the scaled array, a predetermined horizontal coordinate integer for each of two nearest elements in the horizontal dimension of the original array and a horizontal linear interpolation coefficient fixed point number, and for each row of the portion of the scaled array, a predetermined vertical coordinate integer of each of two nearest elements in the vertical dimension of the original array and a vertical linear interpolation coefficient fixed point number, and for each combination of the predetermined horizontal coordinate integers and the predetermined vertical coordinate integers, a value quantized number of the original array, and calculate each element of the portion of the scaled array by applying linear interpolation to value quantized numbers of the original array corresponding to the row of the element and the column of the element, the horizontal linear interpolation coefficient fixed point number corresponding to the column of the element, and the vertical linear interpolation coefficient fixed point number corresponding to the row of the element. In some embodiments, the scaling operation will not be the only operation, or even the primary operation. In such embodiments, the instructions to perform the scaling operation will be among other instructions to be executed by the integrated circuit, such as instructions for neural network inference, etc.

At S944, the instruction section or a sub-section thereof causes the integrated circuit to execute the instructions. For example, the instructing section may instruct the integrated circuit to scale the original array, the integrated circuit in communication with the memory on which the pre-processed data is stored.

At S949, a receiving section, such as the instructing section or a sub-section thereof receives the scaled array from the integrated circuit. In embodiments in which the scaling operation is not the primary operation, the receiving section may not receive the scaled array, but instead receive a result of further computation, in which the scaled array is an intermediate step.

Figure 10:
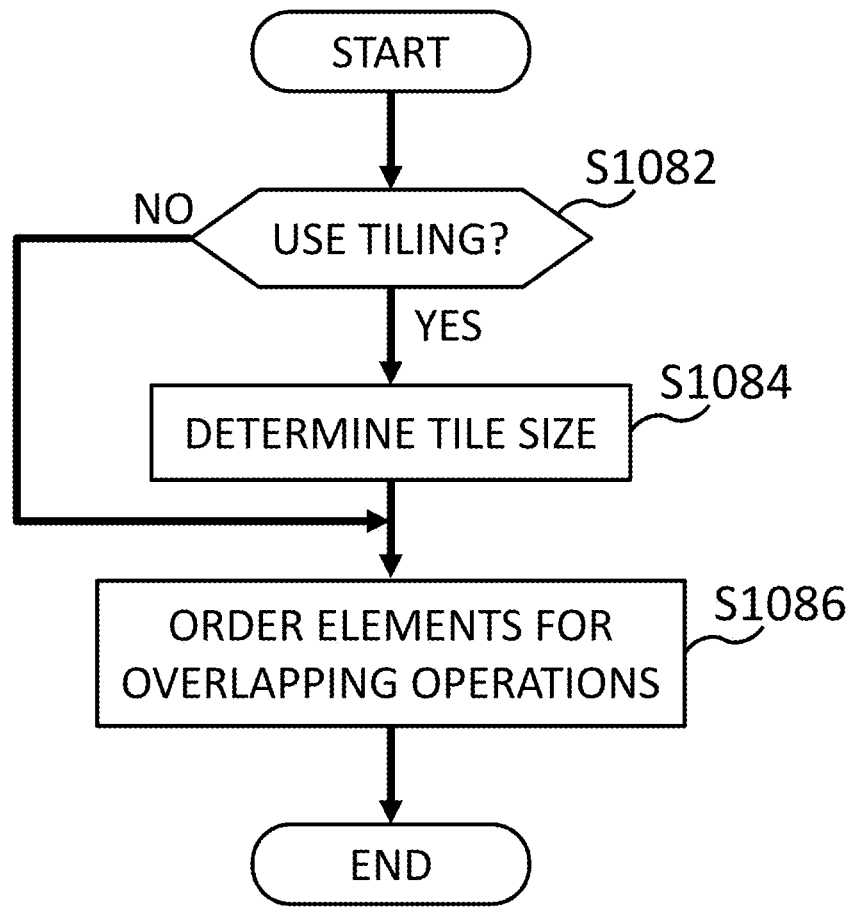
FIG. 10 shows an operational flow for compiling scaling instructions, according to an embodiment of the present invention.

FIG. 10 shows an operational flow for compiling scaling instructions, according to an embodiment of the present invention. The operations within this operational flow may be performed by a compiling section, such as the instructing section or a correspondingly named sub-section thereof. As described in FIG. 9, the original array, scaling factor, nearest coordinates, and linear interpolation coefficients are obtained prior to the scaling operation.

At S1082, a tiling section, such as the compiling section or a sub-section thereof, determines whether to use tiling during execution of the scaling operation. For example, if the onboard memory required to hold all of the pre-processed data and resulting scaled values exceeds the capacity of onboard memory of the integrated circuit, then tiling will be used. In embodiments in which the scaling operation is not the only operation of the integrated circuit, the tiling section may determine whether enough onboard memory can be allocated to the scaling operation to hold all of the pre-processed data and resulting scaled values. If there is enough onboard memory capacity, then the operational flow proceeds to S1086, skipping the tile size determination. If there is not enough onboard memory capacity, then the operational flow proceeds to S1084 to determine a tile size.

At S1084, the tiling section determines a tile size based on a capacity of an onboard memory of the integrated circuit. For example the tile size is selected such that the integrated circuit has enough onboard memory capacity to store and process a whole tile into values of a scaled array. However, as the tile size is reduced, the amount of read operations from the external memory increases, which can have a negative impact on efficiency. It may be ideal for the tile size to be the largest that allows the integrated circuit to perform the scaling operation. The portion of the scaled array corresponds to the tile size, and the read operations and the calculate operations are repeated until each element of the scaled array has been calculated. The size and offset of the necessary part of the pre-processed data may be determined based on the size and offset of the output tile of the scaled array, the necessary part including the data required for calculating each element of the output tile. The size and offset of the input tile of the original array may be determined based on the pre-processed data required for calculating each element of the output tile. The instructions may be compiled such that only the input tile and the pre-processed data required for calculating each element of the output tile are provided to the integrated circuit at a given time. Coordinates among the pre-processed data may need to be adjusted by an offset of the top-left corner of each input tile, which may be done once before the scaling operation, by the integrated circuit or the host processor, or during the scaling operation by the integrated circuit. Linear interpolation coefficients may not need to be changed for the scaling operation.

At S1086, an ordering section, such as the compiling section or a sub-section thereof, orders the calculation of elements of the scaled array such that intermediate results, such as intermediate values, can be reused before being purged, and to avoid repeating a one or more calculations. In other words, the compiling further includes ordering the calculation of elements such that subsequent elements are selected based on overlapping linear interpolation operations. To reuse the intermediate values, the instructions may further cause the integrated circuit to line-cache interpolated values for use in calculating subsequent elements having overlapping linear interpolation operations.

Figure 11:
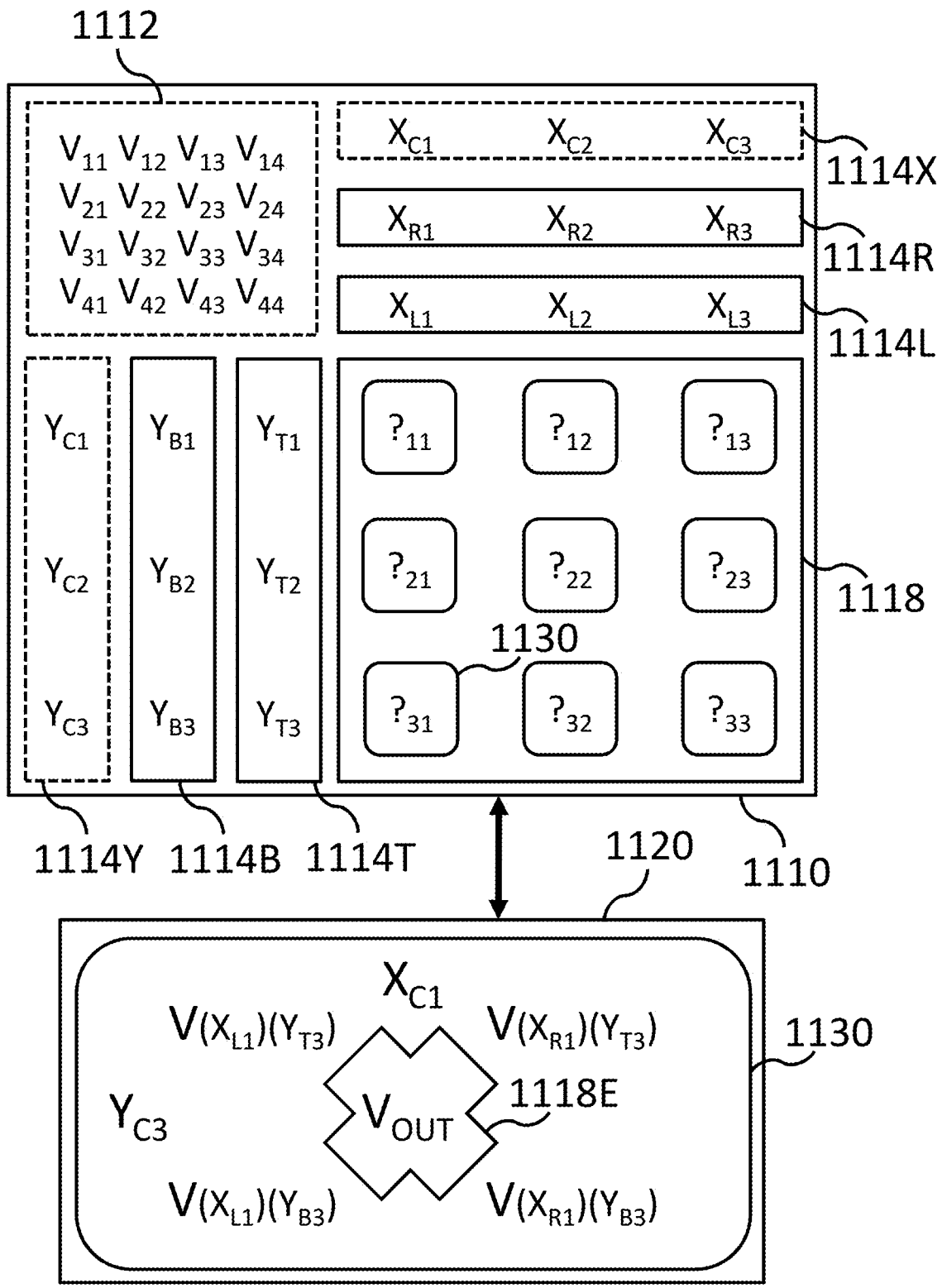
FIG. 11 shows a system for a scaling operation, according to an embodiment of the present invention.

FIG. 11 shows a system for a scaling operation, according to an embodiment of the present invention. The system includes external memory 1110 and an integrated circuit 1120. An original array and a scaling factor have been processed to produce pre-processed data for storage on external memory 1110 so that the scaling operation may be performed by integrated circuit 1120 to obtain a scaled array 1118. In doing so, integrated circuit 1120 may perform an operation as described in FIG. 12, using the pre-processed data including nearest left coordinate integers 1114L, nearest right coordinate integers 1114R, nearest top coordinate integers 1114T, nearest bottom coordinate integers 1114B, horizontal linear interpolation coefficient quantized numbers 1114X, vertical linear interpolation coefficient quantized numbers 1114Y, and value fixed point numbers of the original array 1112. Integrated circuit 1120 utilizes the pre-processed data to determine each value of scaled array 1118. For example, to determine a value 1118E of element 1130 of scaled array 1118, integrated circuit 1120 reads the nearest coordinates and the values of the original array associated with the nearest coordinates. The values associated with the nearest coordinates to element 1130 are the values of the original array located at $(X_{L1}, Y_{T3})$, $(X_{R1}, Y_{T3})$, $(X_{L1}, Y_{B3})$, and $(X_{R1}, Y_{B3})$. To determine value 1118E, integrated circuit 1120 further reads the horizontal linear interpolation coefficient 1114Y and vertical linear interpolation coefficient 11114X associated with element 1130, which are horizontal linear interpolation coefficient $Y_{C3}$ and vertical linear interpolation coefficient $X_{C1}$.

Figure 12:
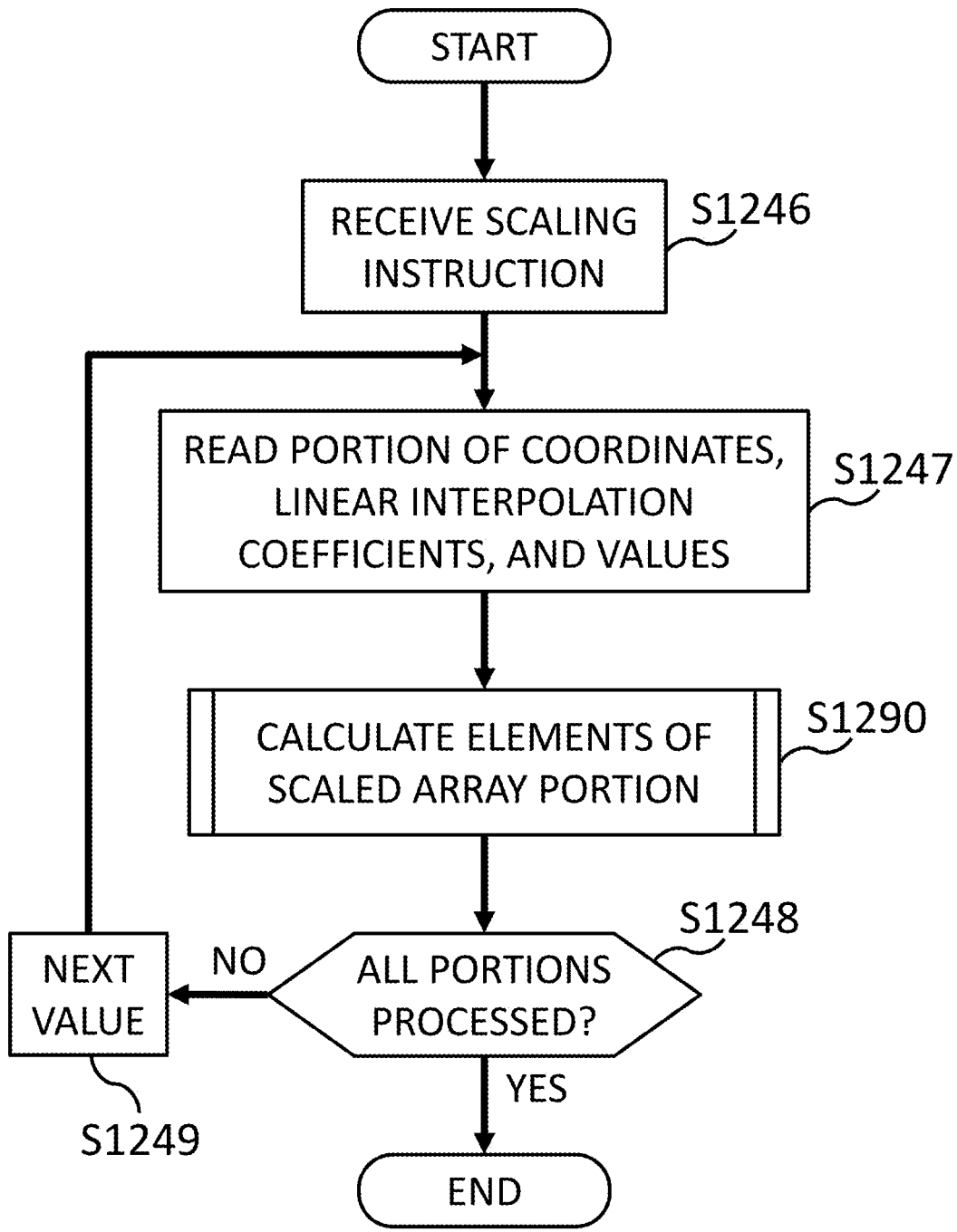
FIG. 12 shows an operational flow for execution of a scaling operation by an integrated circuit, according to an embodiment of the present invention.

FIG. 12 shows an operational flow for execution of a scaling operation by an integrated circuit, according to an embodiment of the present invention. The operational flow may provide a method for scaling. The method may be performed by an integrated circuit including sections for performing certain operations, such as the integrated circuit shown in FIG. 14, which will be explained hereinafter.

At S1246, a receiving section receives a scaling instruction. For example, the receiving section may receive an instruction to generate a scaled array from an original array. The instruction may be received from a host processor that has prepared pre-processed data for the scaling operation, and stored the pre-processed data on an external memory.

At S1247, a reading section reads at least a portion of data from an external memory including coordinates of the original array, linear interpolation coefficients, and values of the original array. For example, the reading section may read, for each column of at least a portion of the scaled array, a predetermined horizontal coordinate integer for each of two nearest elements in the horizontal dimension of the original array and a horizontal linear interpolation coefficient fixed point number, for each row of the portion of the scaled array, a predetermined vertical coordinate integer of each of two nearest elements in the vertical dimension of the original array and a vertical linear interpolation coefficient fixed point number, and, for each combination of the predetermined horizontal coordinate integers and the predetermined vertical coordinate integers, a value quantized number of the original array. If the integrated circuit has sufficient onboard memory capacity, then all of foregoing data may be read at once. Otherwise, the reading section will read the foregoing data in portions, or tiles. The instructions from the host processor may include a tile size which determines the size of each portion, and the read operations and calculate operations are repeated until each element of the scaled array has been calculated.

At S1290, a calculating section calculates elements of the scaled array associated with the portion of data read at S1247. For example, the calculating section calculates each element of the portion of the scaled array by applying linear interpolation to value quantized numbers of the original array corresponding to the row of the element and the column of the element, the horizontal linear interpolation coefficient fixed point number corresponding to the column of the element, and the vertical linear interpolation coefficient fixed point number corresponding to the row of the element. If the integrated circuit has sufficient onboard memory capacity, then all of elements may be calculated at once. Otherwise, the calculating section will calculate elements in portions, or tiles. In other words, the calculating is performed in portions between each portion of the reading. As iterations of S1247 and S1290 proceed, the reading portions and calculating portions are repeated until each element of the scaled array has been calculated.

At S1248, the integrated circuit or a section thereof determines whether or not there are remaining portions for scaling. If there are more unscaled portions, then the operational flow selects the next portion (S1249) before proceeding to another iteration of S1247. If there are no more unscaled portions, then the operational flow ends.

Figure 13:
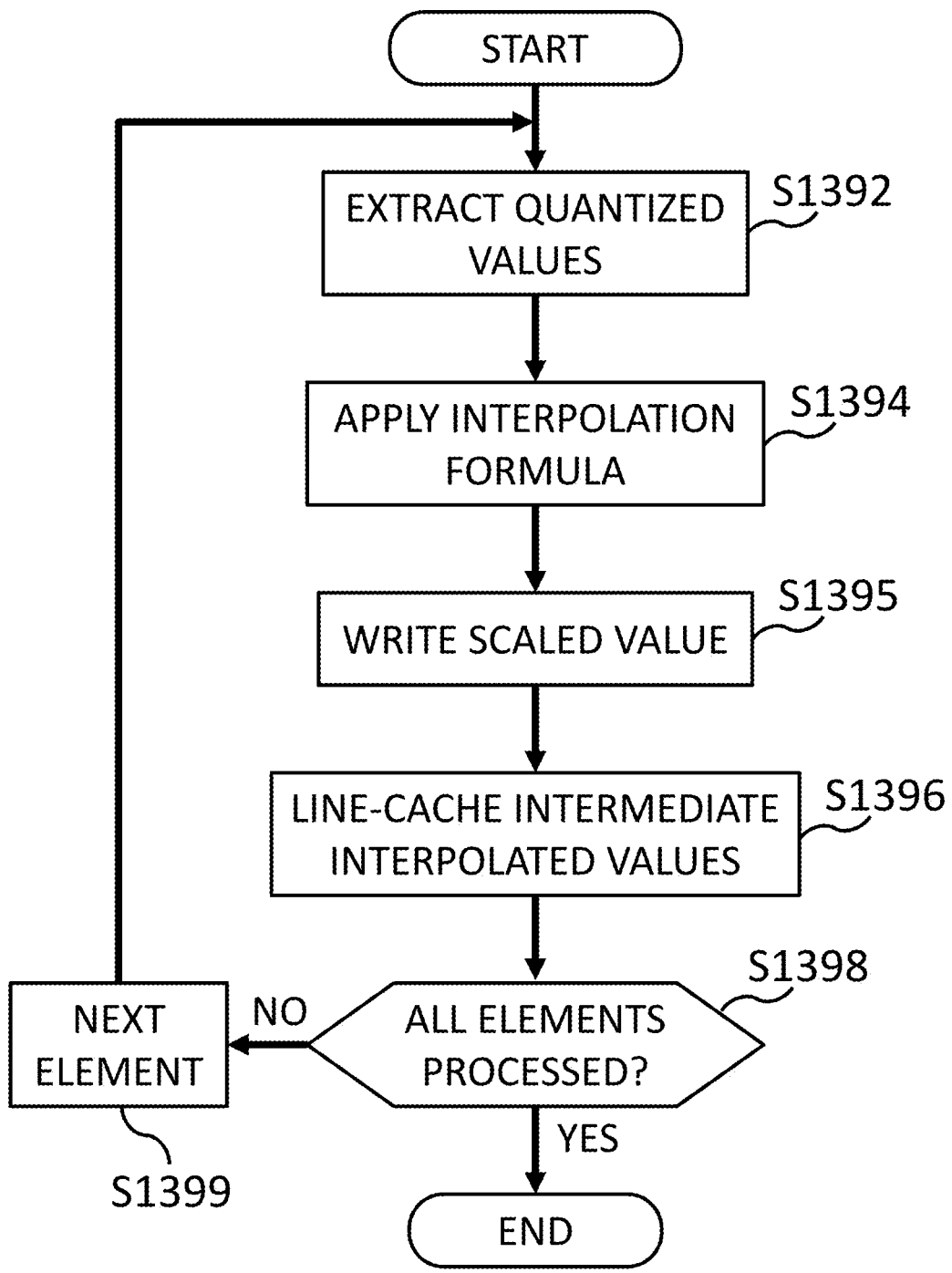
FIG. 13 shows an operational flow for calculating elements of a scaled array portion, according to an embodiment of the present invention.

FIG. 13 shows an operational flow for calculating elements of a scaled array portion, according to an embodiment of the present invention. The operations within this operational flow may be performed by a calculating section or a correspondingly named sub-section thereof. As described in FIG. 12, coordinates of the original array, linear interpolation coefficients, and values of the original array are read prior to the calculating operation.

At S1392, an extracting section, such as the calculating section or a sub-section thereof, extracts the value quantized numbers associated with the nearest coordinates to an element of the scaled array. Using the example of EQ. 2, the extracting section extracts the quantized value X from the quantized Real Number, apart from the scale coefficient SC and zero point ZP. In the example of FIG. 11, the extracting section would extract quantized values from the value quantized numbers of $V(X_{L1})(Y_{T3})$, $V(X_{R1})(Y_{T3})$, $V(X_{L1})(Y_{B3})$, and $V(X_{R1})(Y_{B3})$ in order to calculate the value 1118E of element 1130.

At S1394, an applying section, such as the calculating section or a sub-section thereof, applies an interpolation formula to the quantized values and the linear interpolation coefficient fixed point numbers to calculate a scaled value. For example, the linear interpolation includes performing operations according to:

$$X_C = X_A + ((X_A - X_B) \cdot X_{coeff}) << E_{coeff} \qquad \text{EQ. 4}$$

where $X_C$ is a quantized interpolated value, $X_A$ and $X_B$ are quantized values, $X_{coeff}$ is an integer multiplier of a linear interpolation coefficient, and $E_{coeff}$ is an integer shift value. Using EQ. 4, a scaled value may be calculated in three steps. In the example of FIG. 11, a first step may be to calculate an intermediate value $(X_C)$ between $V_{31}$ $(X_A)$ and $V_{32}$ $(X_B)$, using the integer multiplier $(X_{coeff})$ and the shift value $(E_{coeff})$ of horizontal linear interpolation coefficient $Y_{C3}$. A second step may be to calculate an intermediate value $(X_C)$ between $V_{41}$ $(X_A)$ and $V_{42}$ $(X_B)$, using the integer multiplier $(X_{coeff})$ and the shift value $(E_{coeff})$ of horizontal linear interpolation coefficient $Y_{C3}$. A third step may be to calculate a quantized value of scaled value 1118E as an intermediate value $(X_C)$ between the intermediate value calculated in the first step $(X_A)$ and the intermediate value calculated in the second step $(X_B)$, using the integer multiplier $(X_{coeff})$ and the shift value $(E_{coeff})$ of vertical linear interpolation coefficient $X_{C3}$. Scaled value 1118E can then be derived from the quantized value calculated in the third step by subtracting the zero point ZP and multiplying by the scale coefficient SC, as shown in EQ. 2.

At S1395, a writing section, such as the calculating section or a sub-section thereof writes the scaled value, such as scaled value 1118E in FIG. 11, to a memory. For example, the writing section may write the scaled value to the external memory in embodiments where the primary purpose of the integrated circuit is to perform the scaling operation. In other embodiments, such as where the primary purpose of the integrated circuit is to perform neural network inference, the writing section may write the scaled value to an onboard memory, where the scaled value may be utilized in further processing during inference.

At S1396, a line-caching section, such as the calculating section or a sub-section thereof line-caches intermediate interpolated values for use in calculating subsequent elements having overlapping linear interpolation operations. In the example of FIG. 11, the intermediate value calculated in the first step between $V_{31}$ and $V_{32}$, which was used to ultimately calculate scaled value 1118E for element 1130 of scaled array 1118, would also be used to calculate the scaled value of the element above element 1130. Rather than perform this intermediate value calculation again, line-caching section line-caches this intermediate value so that it can be utilized at the appropriate iteration of S1394 to calculate the scaled value of the element above element 1130. For calculation of the scaled value of the element above element 1130 in this example, the memory read may be reduced by half, and only ⅔ of the runtime computation may be required. In upscaling operations, two or more scaled values may have the same four nearest elements of the original array. In such instances, the latter calculated scaled value may require no further memory read, and only ⅓ of the runtime computation may be required.

At S1398, the calculating section or a sub-section thereof determines whether or not there are remaining elements for calculation. If there are more uncalculated elements, then the operational flow selects the next element (S1399) before proceeding to another iteration of S1392. If there are no more uncalculated elements, then the operational flow ends.

In this embodiment, the operational flow includes extracting quantized values and deriving quantized numbers in order to operate with quantized numbers. In other embodiments, the operational flow may operate directly with quantized values. In such embodiments, the write operation writes the quantized value resulting from the interpolation formula, and the extract operation is unnecessary. A host processor may perform extraction of quantized values, and may also be responsible for deriving quantized numbers from the resultant quantized values written to the external memory by the integrated circuit, sometimes referred to as requantization. Such embodiments may be useful where an integrated circuit exclusively performs the scaling operation, or where the inference or other intended function can be performed using quantized values.

Figure 14:
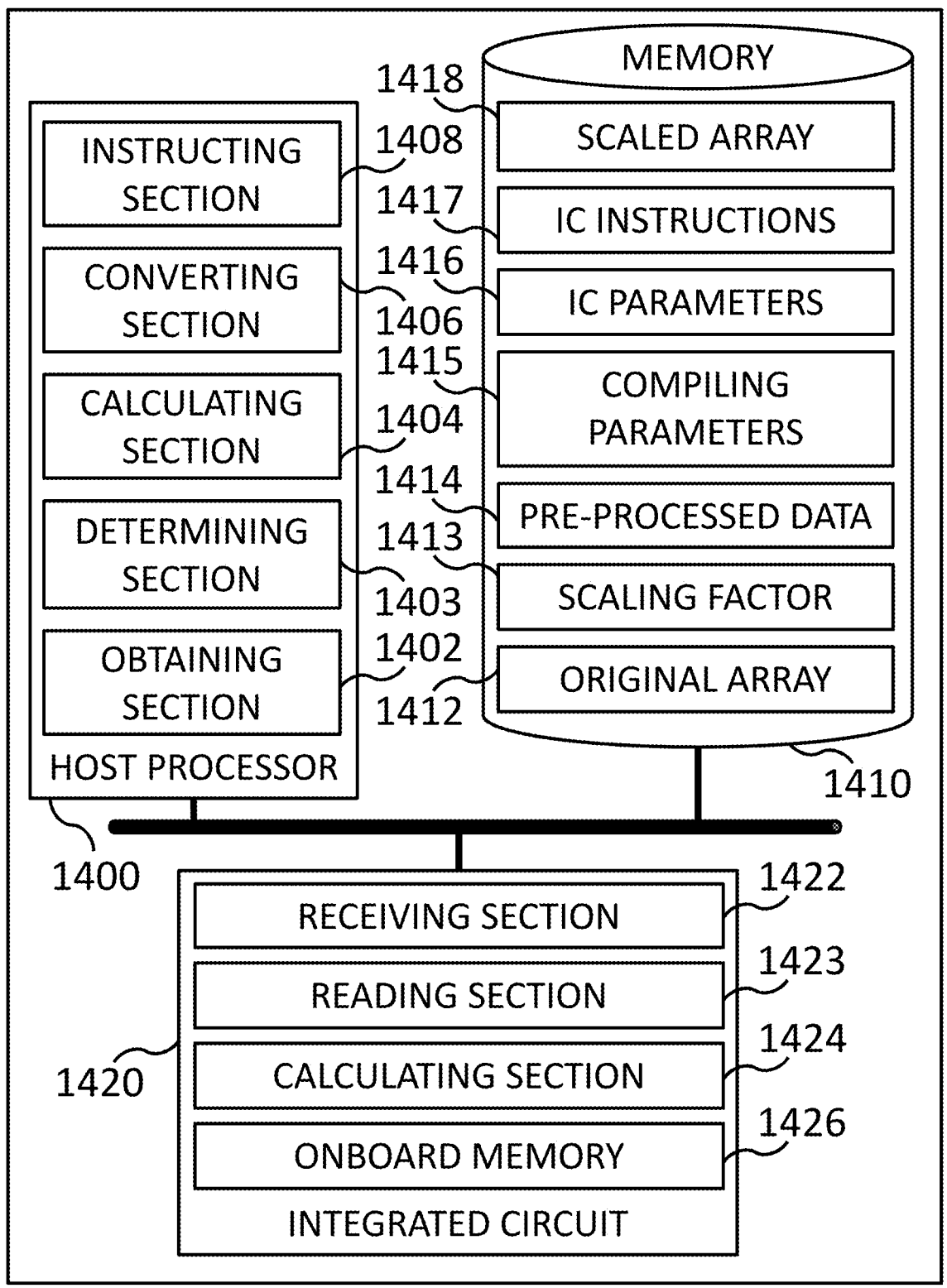
FIG. 14 shows a hardware configuration for preparation and execution of quantized scaling, according to an embodiment of the present invention.

FIG. 14 shows a hardware configuration for preparation and execution of quantized scaling, according to an embodiment of the present invention. The exemplary hardware configuration includes host processor 1400, which communicates with external memory 1410 and integrated circuit 1420. Host processor 1400, external memory 1410, and integrated circuit 1420 may be part of a host computer such as a server computer or a mainframe computer that executes an on-premise application and hosts client computers that use it. Host processor 1400, external memory 1410, and integrated circuit 1420 may be part of a personal computer, mobile computer, or small scale computing device that executes an application for a user.

In this embodiment, host processor 1400 can be thought of as a logic section, such as a computer program product including one or more computer readable storage mediums collectively storing program instructions that are executable by a processor or programmable circuitry to cause the processor or programmable circuitry to perform the operations of the various sections. Host processor 1400 may alternatively be analog or digital programmable circuitry, or any combination thereof. Host processor 1400 may be composed of physically separated storage or circuitry that interacts through communication. External memory 1410 may be a volatile or non-volatile computer-readable medium capable of storing data for access by host processor 1400 during performance of the processes herein. Integrated circuit 1420 may be a hardware chip capable of performing scaling operations, neural architecture inference, etc., such as an FPGA, ASIC, etc.

Host processor 1400 includes obtaining section 1402, determining section 1403, calculating section 1404, converting section 1406, and instructing section 1408. External memory 1410 includes original array 1412, scaling factor 1413, pre-processed data 1414, compiling parameters 1415, integrated circuit parameters 1416, integrated circuit instructions 1417, and scaled array 1418.

Obtaining section 1402 is the portion of host processor 1400 that obtains information for preparation and execution of quantized scaling. For example, obtaining section 1402 may be configured to obtain an original array and a scaling factor. Obtaining section 1402 may store obtained information in external memory 1410 as original array 1412 and scaling factor 1413. Obtaining section 1402 may include sub-sections for performing additional functions, as described in the foregoing flow charts. Such sub-sections may be referred to by a name associated with their function.

Determining section 1403 is the portion of host processor 1400 that makes various determinations for preparation and execution of quantized scaling, such as coordinates or nearest elements in an original array, etc. While determining, determining section 1403 may access original array 1412, scaling factor 1413, and pre-processed data 1414. Determining section 1403 may include sub-sections for performing additional functions, as described in the foregoing flow charts. Such sub-sections may be referred to by a name associated with their function.

Calculating section 1404 is the portion of host processor 1400 that calculates linear interpolation coefficients. While calculating, calculating section 1404 may access original array 1412, scaling factor 1413, and pre-processed data 1414. Calculating section 1404 may include sub-sections for performing additional functions, as described in the foregoing flow charts. Such sub-sections may be referred to by a name associated with their function.

Converting section 1406 is the portion of host processor 1400 that converts floating point numbers into quantized numbers or fixed point numbers. While converting, converting section 1406 may access original array 1412, scaling factor 1413, and pre-processed data 1414. Converting section 1406 may include sub-sections for performing additional functions, as described in the foregoing flow charts. Such sub-sections may be referred to by a name associated with their function.

Instructing section 1408 is the portion of host processor 1400 that instructs integrated circuit 1420 to perform a scaling operation. For example, instructing integrated circuit to perform a scaling operation may include compiling instructions that, when executed by the integrated circuit, cause the integrated circuit to perform the scaling operation. While compiling instructions, instructing section 1408 may access original array 1412, scaling factor 1413, pre-processed data 1414, compiling parameters 1415, integrated circuit parameters 1416, and integrated circuit instructions 1417. Instructing section 1408 may include sub-sections for performing additional functions, as described in the foregoing flow charts. Such sub-sections may be referred to by a name associated with their function.

Integrated circuit 1420 includes receiving section 1422, reading section 1423, calculating section 1424, and onboard memory 1426.

Receiving section 1422 is the portion of integrated circuit 1420 that receives instructions, such as instructions to perform a scaling operation. While receiving instructions, receiving section 1422 may access integrated circuit instructions 1417, or may receive instructions directly from instructing section 1408. Receiving section 1422 may store instructions in onboard memory 1426. Receiving section 1422 may include sub-sections for performing additional functions, as described in the foregoing flow charts. Such sub-sections may be referred to by a name associated with their function.

Reading section 1423 is the portion of integrated circuit 1420 that reads data from external memory 1410, such as data for performing a scaling operation. Reading section 1423 may read data from original array 1412, scaling factor 1413, and pre-processed data 1414. Reading section 1423 may include sub-sections for performing additional functions, as described in the foregoing flow charts. Such sub-sections may be referred to by a name associated with their function.

Calculating section 1424 is the portion of integrated circuit 1420 that performs calculations, such as calculating scaled values from pre-processed data 1414. Calculating section 1424 may read data from original array 1412, scaling factor 1413, and pre-processed data 1414. Calculating section 1424 may include sub-sections for performing additional functions, as described in the foregoing flow charts. Such sub-sections may be referred to by a name associated with their function.

Onboard memory 1426 may be a computer-readable medium, such as RAM, flash memory, or other embedded writable memory, capable of storing data for access by receiving section 1422, reading section 1423, and calculating section 1424 during execution of a scaling operation.

In other embodiments, the host processor may be any other device capable of processing logical functions in order to perform the processes herein. The external memory may be one or more computer-readable mediums. For example, the host processor may be a central processing unit (CPU) and the external memory may be a dynamic random access memory (DRAM), in which the computer-executable instructions may be copied in whole or in part for execution by the CPU during performance of the processes herein.

In embodiments where the apparatus is a computer, a program that is installed in the computer can cause the computer to function as or perform operations associated with apparatuses of the embodiments of the present invention or one or more sections (including modules, components, elements, etc.) thereof, and/or cause the computer to perform processes of the embodiments of the present invention or steps thereof. Such a program may be executed by a processor to cause the computer to perform certain operations associated with some or all of the blocks of flowcharts and block diagrams described herein.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A non-transitory computer readable medium comprising a computer program including instructions that are executable by a computer to cause the computer to perform operations comprising:
    obtaining an original array and a scaling factor representing a ratio of a size of the original array to a size of a scaled array;
    determining, for each column of the scaled array, a horizontal coordinate of each of two nearest elements in the horizontal dimension of the original array, and, for each row of the scaled array, a vertical coordinate of each of two nearest elements in the vertical dimension of the original array;

calculating, for each row of the scaled array and each column of the scaled array, a linear interpolation coefficient based on the scaling factor;

converting each value of the original array from a floating point number into a quantized number;

converting each linear interpolation coefficient from a floating point number into a fixed point number;

storing, in an external memory, the horizontal coordinates and vertical coordinates as integers, the values as quantized numbers, and the linear interpolation coefficients as fixed point numbers;

compiling instructions to scale the original array;

receiving the compiled instructions at an integrated circuit causing the integrated circuit to scale the original array, the integrated circuit in communication with the external memory;

wherein scaling the original array comprises calculating elements of at least a portion of the scaled array;

wherein the compiling includes:

determining a tile size based on a capacity of an onboard memory of the integrated circuit;

wherein the portion of the scaled array corresponds to the tile size, and the calculating elements of the at least a portion of the scaled array are repeated until each element of the scaled array has been calculated.

2. The non-transitory computer readable medium of claim 1, further comprising: receiving the scaled array from the integrated circuit.

3. The non-transitory computer readable medium of claim 2, wherein the instructions cause the integrated circuit to: read, from the memory: for each column of at least a portion of the scaled array, a predetermined horizontal coordinate integer for each of two nearest elements in the horizontal dimension of the original array and a horizontal linear interpolation coefficient fixed point number, and for each row of the portion of the scaled array, a predetermined vertical coordinate integer of each of two nearest elements in the vertical dimension of the original array and a vertical linear interpolation coefficient fixed point number, and for each combination of the predetermined horizontal coordinate integers and the predetermined vertical coordinate integers, a value quantized number of the original array; and calculate each element of the portion of the scaled array by applying linear interpolation to: value quantized numbers of the original array corresponding to the row of the element and the column of the element, the horizontal linear interpolation coefficient fixed point number corresponding to the column of the element, and the vertical linear interpolation coefficient fixed point number corresponding to the row of the element.

4. The non-transitory computer readable medium of claim 3, wherein the compiling includes; determining a tile size based on a capacity of an onboard memory of the integrated circuit; wherein the portion of the scaled array corresponds to the tile size, and the read operations and the calculate operations are repeated until each element of the scaled array has been calculated.

5. The non-transitory computer readable medium of claim 3, wherein the linear interpolation applied by the integrated circuit includes performing operations according to:

$$X_C = X_A + ((X_A - X_B) \cdot X_{coeff}) << E_{coeff}$$

where $X_C$ is a quantized interpolated value, $X_A$ and $X_B$ are quantized values, $X_{coeff}$ is an integer multiplier of a linear interpolation coefficient, and $E_{coeff}$ is an integer shift value.

6. The non-transitory computer readable medium of claim 4, wherein the compiling further includes ordering the calculation of elements such that subsequent elements are selected based on overlapping linear interpolation operations, and the instructions cause the integrated circuit to line-cache interpolated values for use in calculating subsequent elements having overlapping linear interpolation operations.

7. The non-transitory computer readable medium of claim 1, wherein converting each linear interpolation coefficient includes: determining a width for all fixed point numbers, and determining, for each fixed point number, an integer multiplier and an integer shift value, each integer multiplier having a size defined by the width.

8. The non-transitory computer readable medium of claim 1, wherein converting each value of the original array includes: determining a scale coefficient and a zero point for all quantized numbers, and determining, for each quantized number, a quantized value.

9. The non-transitory computer readable medium of claim 1, wherein the scaling factor includes a horizontal scaling factor and a vertical scaling factor, the horizontal scaling factor representing a ratio of a width of the original array to a width of a scaled array, and the vertical scaling factor representing a ratio of a height of the original array to a height of a scaled array.

10. A non-transitory computer readable medium comprising a computer program including instructions that are executable by a system to cause the system to perform operations comprising:

pre-processing, via a host processor, an original array and a scaling factor representing a ratio of a size of the original array to a size of a scaled array;

compiling instructions, via the host processor, to scale the original array;

receiving, at an integrated circuit, the compiled instructions to generate a scaled array from an original array, the integrated circuit in communication with the external memory;

reading by the integrated circuit from an external memory:

for each column of at least a portion of the scaled array, a predetermined horizontal coordinate integer for each of two nearest elements in the horizontal dimension of the original array and a horizontal linear interpolation coefficient fixed point number, for each row of the portion of the scaled array, a predetermined vertical coordinate integer of each of two nearest elements in the vertical dimension of the original array and a vertical linear interpolation coefficient fixed point number, and for each combination of the predetermined horizontal coordinate integers and the predetermined vertical coordinate integers, a value quantized number of the original array; and calculating, by the integrated circuit, each element of the portion of the scaled array by applying linear interpolation to:

value quantized numbers of the original array corresponding to the row of the element and the column of the element, the horizontal linear interpolation coefficient fixed point number corresponding to the column of the element, and the vertical linear interpolation coefficient fixed point number corresponding to the row of the element;

wherein the compiling includes:

determining a tile size based on a capacity of an onboard memory of the integrated circuit, the portion of the scaled array corresponds to the tile size, and the read operations and calculate operations are repeated until each element of the scaled array has been calculated.

11. The non-transitory computer readable medium computer program of claim 10, wherein the linear interpolation includes performing operations according to:

$$X_C = X_A + ((X_A - X_B) \cdot X_{coeff}) << E_{coeff}$$

where $X_C$ is a quantized interpolated value, $X_A$ and $X_B$ are quantized values, $X_{coeff}$ is an integer multiplier of a linear interpolation coefficient, and $E_{coeff}$ is an integer shift value.

12. The non-transitory computer readable medium of claim 10, wherein the calculating includes: ordering the elements such that subsequent elements are selected based on overlapping linear interpolation operations, and line-caching interpolated values for use in calculating subsequent elements having overlapping linear interpolation operations.

13. The non-transitory computer readable medium of claim 10, wherein the calculating further includes writing a calculated value of each element of the scaled array to the external memory.

14. A computer-implemented method comprising:

obtaining, by a host processor, an original array and a scaling factor representing a ratio of a size of the original array to a size of a scaled array;

determining by the host processor, for each column of the scaled array, a horizontal coordinate of each of two nearest elements in the horizontal dimension of the original array, and, for each row of the scaled array, a vertical coordinate of each of two nearest elements in the vertical dimension of the original array;

calculating by the host processor, for each row of the scaled array and each column of the scaled array, a linear interpolation coefficient; converting each value of the original array from a floating point number into a quantized number; converting each linear interpolation coefficient from a floating point number into a fixed point number;

storing, in an external memory, the horizontal coordinates and vertical coordinates as integers, the values as quantized numbers, and the linear interpolation coefficients as fixed point numbers;

compiling, by the host processor, instructions to scale the original array;

receiving the compiled instructions at an integrated circuit causing the integrated circuit to scale the original array, the integrated circuit in communication with the external memory;

wherein scaling the original array comprises calculating elements of at least a portion of the scaled array;

wherein the compiling includes:

determining a tile size based on a capacity of an onboard memory of the integrated circuit;

wherein the portion of the scaled array corresponds to the tile size, and the calculating elements of the at least a portion of the scaled array are repeated until each element of the scaled array has been calculated.

15. The computer-implemented method of claim 14, further comprising: receiving the scaled array from the integrated circuit at the host processor.

16. The computer-implemented method of claim 14, wherein the instructions cause the integrated circuit to: read, from the memory: for each column of at least a portion of the scaled array, a predetermined horizontal coordinate integer for each of two nearest elements in the horizontal dimension of the original array and a horizontal linear interpolation coefficient fixed point number, and for each row of the portion of the scaled array, a predetermined vertical coordinate integer of each of two nearest elements in the vertical dimension of the original array and a vertical linear interpolation coefficient fixed point number, and for each combination of the predetermined horizontal coordinate integers and the predetermined vertical coordinate integers, a value quantized number of the original array; and calculate each element of the portion of the scaled array by applying linear interpolation to: value quantized numbers of the original array corresponding to the row of the element and the column of the element, the horizontal linear interpolation coefficient fixed point number corresponding to the column of the element, and the vertical linear interpolation coefficient fixed point number corresponding to the row of the element.

17. The computer-implemented method of claim 16, wherein the read operations and the calculate operations are repeated until each element of the scaled array has been calculated.

* * * * *